Sept. 20, 1932.  A. W. FISHER ET AL  1,878,273
LIGHT SIGNAL
Filed April 25, 1929   2 Sheets-Sheet 2
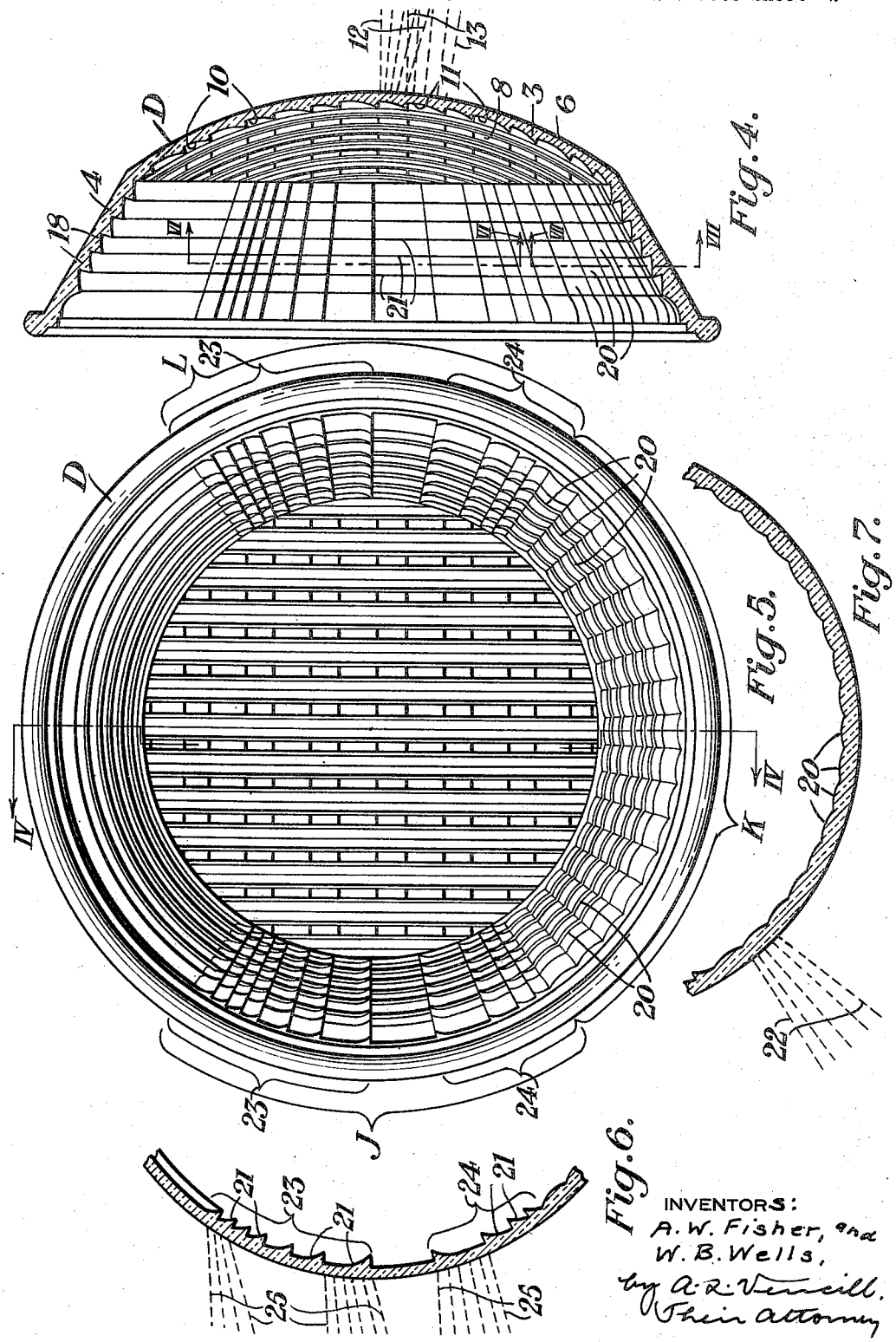
INVENTORS:
A. W. Fisher, and
W. B. Wells,
by A. R. Vencill.
Their attorney Patented Sept. 20, 1932

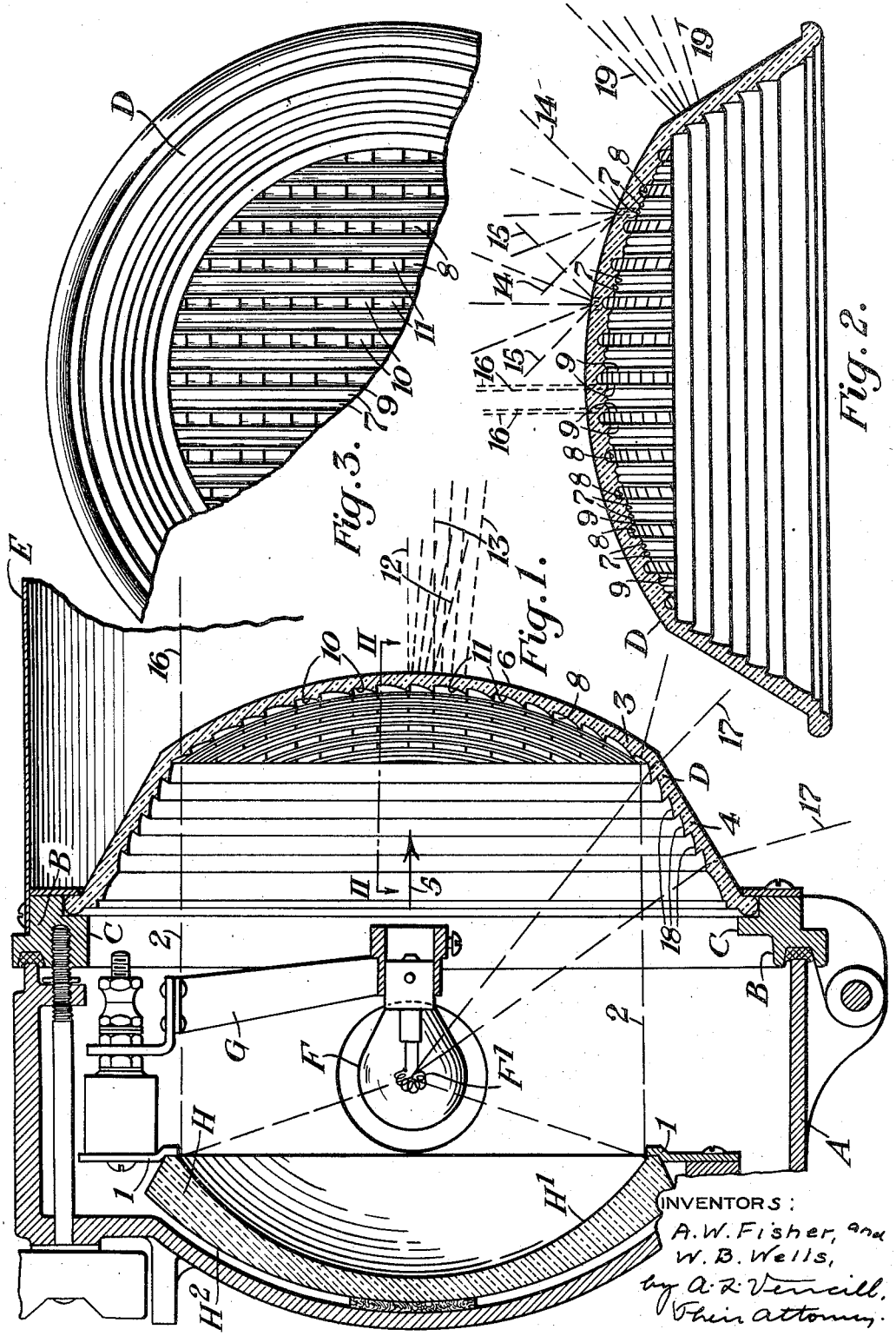

1,878,273

UNITED STATES PATENT OFFICE

ARTHUR W. FISHER, OF FOREST HILLS BOROUGH, AND WESLEY B. WELLS, OF WILKINSBURG, PENNSYLVANIA, ASSIGNORS TO THE UNION SWITCH & SIGNAL COMPANY, OF SWISSVALE, PENNSYLVANIA, A CORPORATION OF PENNSYLVANIA

LIGHT SIGNAL

Application filed April 25, 1929. Serial No. 358,130.

Our invention relates to light signals.

We will describe two forms of light signals embodying our invention, and will then point out the novel features thereof in claims.

The present application is a continuation of our co-pending application filed March 10, 1928, Serial No. 260,593, for light signals, in so far as the subject matter common to the two cases is concerned.

In the accompanying drawings, Fig. 1 is a vertical longitudinal sectional view showing one form of light signal embodying our invention. Fig. 2 is a sectional view of the lens D of the light signal shown in Fig. 1 along the line II—II. Fig. 3 is a fragmental view showing a portion of the lens D of Fig. 1 as it would appear if viewed from the left in Fig. 1. Fig. 4 is a sectional view of a modified form of the lens D shown in Fig. 1, and also embodying our invention. Fig. 5 is a view showing the lens D of Fig. 4 as it would appear if viewed from the left in Fig. 4. Fig. 6 is a sectional view of a sector J of the lens D of Figs. 4 and 5 taken on the line VI—VI of Fig. 4. Fig. 7 is a sectional view of a sector K of the lens D of Figs. 4 and 5 taken on the line VII—VII of Fig. 4.

Similar reference characters refer to similar parts in each of the several views.

Referring first to Fig. 1, the signal comprises a housing A provided with a hinged front plate B having an aperture C. Located in the housing A is a source of light, such for example, as an electric lamp F having a filament $F^1$. The lamp F is supported by a suitable bracket G secured to the housing A. The reference character H designates a reflector which in the form here shown is of the "Mangin mirror" type and comprises a body of glass having a concave spherical unsilvered surface $H^1$ and a convex spherical silvered surface $H^2$. The reflector H is proportioned and disposed in such manner that light from lamp F is projected by this reflector in the direction of the axis 5 in a main beam of substantially parallel rays as indicated by the broken lines 2—2.

The aperture C in the front plate B is covered by a lens designated in general by the reference character D, which lens is protected from the direct rays of the sun by a hood E secured to the front plate B. The lens D comprises a substantially spherical central portion 3 and a zone portion 4 in the form of a portion of a truncated cone. It will be seen that the beam projected from the reflector H passes through the central portion 3 of the lens D and that light is supplied to the zone portion 4 of the lens D directly from the lamp F.

Signals embodying our invention are particularly suitable for, though in no way limited to, use as highway crossing signals, that is, signals that are located adjacent the intersections of highways and railways to warn users of the highway of the approach of a train along the railway. When utilized in this manner, the signal is usually mounted in such position that the axis 5 of the main beam of the signal is directed toward a point on the highway at a considerable distance from the signal. It is desirable, however, that the signal indication should also be visible from all positions in front and to the sides of the signal. In order to accomplish this, we prefer to construct the lens D with a smooth convex surface and to provide the concave surface of the lens with light diffracting means that will give the desired light spread. As best shown in Figs. 2 and 3, the concave surface of the central portion of the lens is provided with a plurality of parallel grooves 7 and channels 8. The grooves 7 have rounded bottoms, and are arranged in pairs, one of the channels 8 being disposed between each two pairs of grooves 7. It will be seen that due to the shapes of the grooves 7, the light passing through each such groove will be spread through 45° on each side of the axis of the main beam, as indicated by the lines 14 in Fig. 2. This arrangement gives the desired horizontal dispersion of the light to render the signal indication visible to observers located on either side of the axis of the main beam.

Each channel 8 is provided with a plurality of prismatic steps as best shown in Fig. 1. The proportions of the steps are such that each alternate step 10 spreads the light passing through such step downwardly through an angle of approximately 15°, as indicated by lines 12—12 in Fig. 1. The remaining steps 11 have a different shape from steps 10 and are designed to produce a downward spread of light of approximately 5°, as indicated by the lines 13 in Fig. 1. With this construction, it will be seen that the light signal gives a comparatively strong indication through 5° below the horizontal, and a somewhat weaker indication from 5° below the horizontal to 15° below the horizontal. Furthermore, each of the steps 10 and 11 in each of the channels 8 is rounded, as shown best in Fig. 2, to give side spread of the light which is refracted downward by these steps. This effect is illustrated in Fig. 2 by the lines 15, it being noted that the light which passes through each channel 8 is spread through substantially 90°, or 45° on each side of the axis of the main beam.

In order to render the signal indications visible from points still farther to the side of the signal and from points directly below the signal, the interior surface of the zone portion 4 of the lens D is provided with a series of annular grooves which form prismatic rings 18. These prismatic rings are so disposed that light incident directly upon the zone portion of the lens from the lamp F is spread through a region of substantially 30 degrees, commencing 45° from the axis 5, as indicated by the lines 19 in Fig. 2, and the lines 17 in Fig. 1.

It should be noted that with signals embodying our invention a powerful front indication is obtained by virtue of the rays of the main beam that pass through the bottoms of the grooves 7 and channels 8. Furthermore, the regions 9 between each pair of grooves 7 and the adjacent channel 8 are parallel to the convex surface of the central portion of the lens so that the light which passes through these regions of the lens is substantially unrefracted as indicated by the broken lines 16 in Fig. 2. Due to the rounded shape of the channels 8 and grooves 7, a comparatively large proportion of the main beam is caused to diverge to each side of the axis of the beam to give good side spread, and the annular prisms 18 on the interior of the zone portion 4 of the lens improve the side spread of the signal to make the indications of the signal visible from practically all points in front of the signal. Furthermore, the signal indication is visible below the axis of the main beam, due to the spread introduced by steps 10 and 11 in each channel 8 and by the prisms 18.

Referring now to Figs. 4, 5, 6, and 7, the lens D, in the form here shown, is exactly like the lens D shown in Figs. 1, 2 and 3, except that the zone portion 4 is provided with means for improving the close-up indication from points directly beneath and on each side of the signal. The means for improving the close-up indication from points directly beneath the signal comprise a plurality of semi-cylindrical ridges 20, which are superimposed on the annular prismatic rings 18 in radially extending rows over a sector K of the zone portion 4 located at the bottom of the lens D. The radius of curvature of each of the ridges 20 is such that light incident upon the ridges directly from the lamp F is spread through an angle of approximately 20° in the vertical plane which is normal to the axis 5, as indicated by the lines 22 in Fig. 7. This arrangement causes practically all of the sector K to appear illuminated to an observer directly beneath the signal; whereas, the form of the lens D shown in Figs. 1, 2 and 3, displays only a narrow radially extending illuminated band.

The means for improving the close-up indication from the sides of the signal comprise a plurality of prismatic ribs 21, which ribs are superimposed on the annular prismatic rings 18 over two spaced sectors J and L of the zone portion 4, the sectors J and L being located on opposite sides of the sector K. The ribs in each sector are arranged in an upper group 23 and a lower group 24 of radially extending rows. As best seen in Fig. 6, the faces of the ribs are curved; and the ribs in each of the lower groups 24 are inclined upwardly in such manner that light, incident upon these ribs directly from the lamp F, is deflected upwardly; while the ribs in each of the upper groups 23 are inclined downwardly in such manner that light, incident upon the ribs of these upper groups directly from the lamp F, is deflected downwardly. The proportions of each of the ribs are such that light incident thereon directly from the lamp F will have a vertical spread of from 2° to 15° below the horizontal plane, as indicated by the lines 25 in Fig. 6. With the ribs arranged in this manner, the signal, when viewed from any point at the side of the signal between 2° and 15° below the horizontal will appear illuminated throughout the total area of the sectors J or L, depending upon the side from which the signal is viewed.

It will also be noted, that with the prismatic ribs 21 and the semi-cylindrical ridges 20 superimposed on the annular prisms 18 of the zone portion 4, as shown in Figs. 4, 5, 6 and 7, the light rays from the signal are spread in the horizontal plane which is normal to the axis of the main beam in a manner which produces an effective and efficient close-up indication of the signal, while retaining all the advantages previously pointed out in connection with the lens shown in Figs. 1–3, inclusive.

Although we have herein shown and described only two forms of light signals embodying our invention, it is understood that various changes and modifications may be made therein within the scope of the appended claims without departing from the spirit and scope of our invention.

Having thus described our invention, what we claim is:

1. A light signal comprising a source of light, means for projecting a beam of substantially parallel rays from said source, and a convex lens interposed in said beam and having its inner face provided with a plurality of parallel rounded grooves and channels, and a plurality of light diffracting prisms in each channel.

2. A lens for a light signal having concentric convex outer and concave inner surfaces, said inner surfaces being provided with parallel round-bottomed grooves arranged in pairs and provided also with channels parallel with said grooves and one located between each two adjacent pairs of grooves and each channel having a plurality of prisms of different optical characteristics, each channel being spaced from each adjoining groove by a non-refracting region which permits the transmission of light substantially without spread.

3. A lens for a light signal comprising a central portion having a concave inner surface provided with parallel vertically extending round-bottomed grooves arranged in pairs and with channels parallel with said grooves and one located between each two adjacent pairs of grooves each channel having a plurality of prisms adjacent ones of which have different optical characteristics and which are arranged in horizontal rows and all of which deflect light downwardly, each channel being spaced from each adjoining groove by a non-refracting region which permits the transmission of light substantially without spread.

4. A lens for a light signal having a zone portion in the form of a part of a truncated cone and provided with a series of annular prismatic rings and with a plurality of semi-cylidrical ridges and with a plurality of prismatic ribs, said ridges being superimposed on said rings in radially extending rows over a sector located at the bottom of said zone portion and said ribs being superimposed on said rings in four groups of radially extending rows two of which are arranged to deflect light upwardly and are located on each side of said bottom sector and the remaining two of which are arranged to deflect light downwardly and are located one adjacent each of said first two groups.

In testimony whereof we affix our signatures.

ARTHUR W. FISHER.
WESLEY B. WELLS.